United States Patent [19]
Bennett

[11] 3,827,119
[45] Aug. 6, 1974

[54] TOOL HOLDER WITH PROVISIONS FOR ACCURATELY POSITIONING CUTTING INSERTS AND AN IMPROVED CHIP BREAKING INDEXIBLE INSERT

[76] Inventor: John T. Bennett, 47 Paper Mill Ln., Newtown Square, Pa. 15078

[22] Filed: Sept. 7, 1973

[21] Appl. No.: 395,226

Related U.S. Application Data

[62] Division of Ser. No. 285,121, Aug. 31, 1972, which is a division of Ser. No. 19,023, March 12, 1970, Pat. No. 3,688,367.

[52] U.S. Cl. ............................. 29/105 R, 29/103 A
[51] Int. Cl. ............................................. B26d 1/12
[58] Field of Search .......... 29/105 R, 105 A, 103 A

[56] References Cited
UNITED STATES PATENTS

| | | | |
|---|---|---|---|
| 3,195,376 | 7/1965 | Bader | 29/105 R X |
| 3,512,236 | 5/1970 | Renaud | 29/105 R |
| 3,588,976 | 6/1971 | Dupuis et al. | 29/105 R |
| 3,616,507 | 11/1971 | Wirfelt | 29/105 A |

*Primary Examiner*—Harrison L. Hinson
*Attorney, Agent, or Firm*—Woodcock, Washburn, Kurtz & Mackiewicz

[57] ABSTRACT

A tool holder having at least one cutting insert (blade) receiving slot that is formed in part by a pair of spools at adjacent small side areas of the slot. The spools are held at a finite angle with each other which matches the angle between adjacent edges of a blade to be inserted in the slot. The spools provide a ridge to contact blade edge surfaces for only a small portion of their width. An application of this blade positioning technique is a multiple indexible blade rotary tool holder. Indexible blades for use in a wide variety of tool holders have improved chip breaking grooves adjacent to its cutting edges in surfaces thereof which lead into the work piece.

5 Claims, 14 Drawing Figures

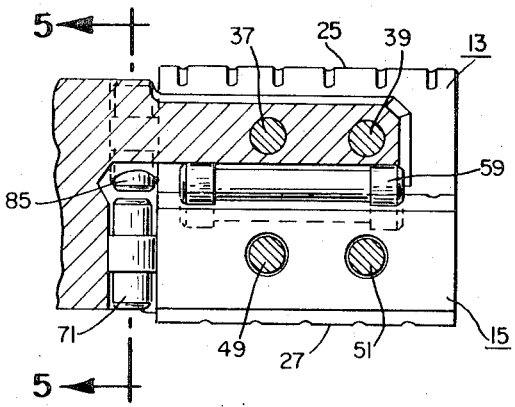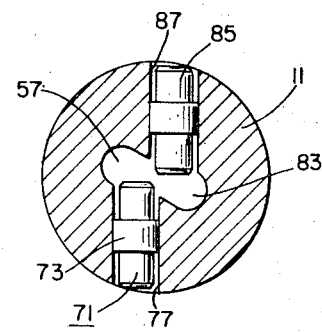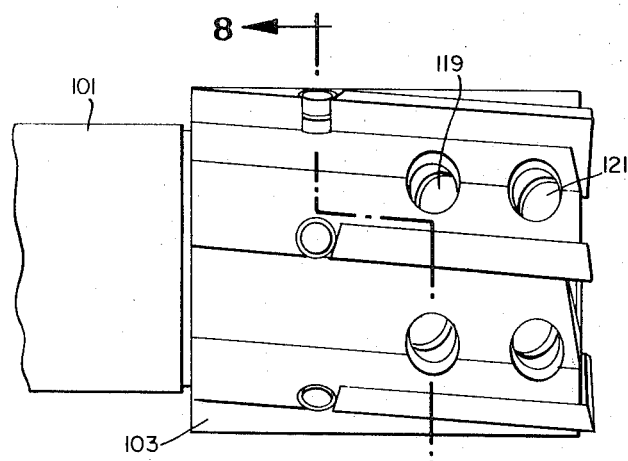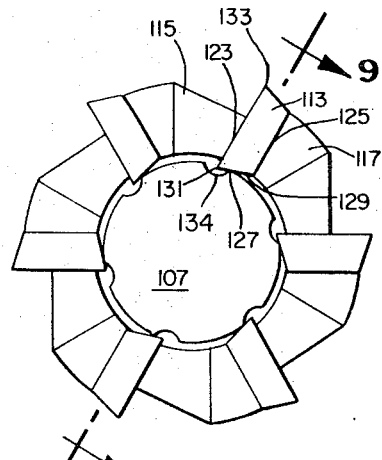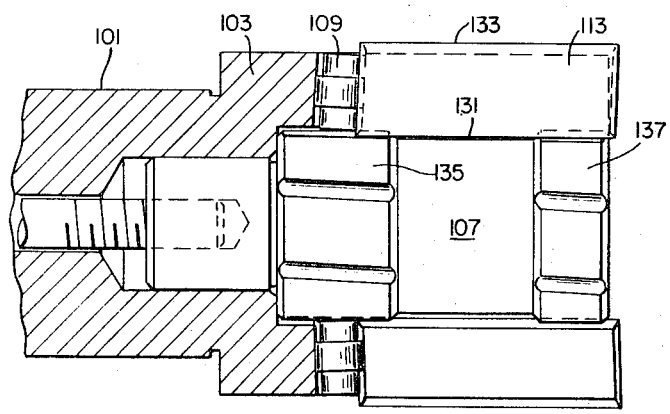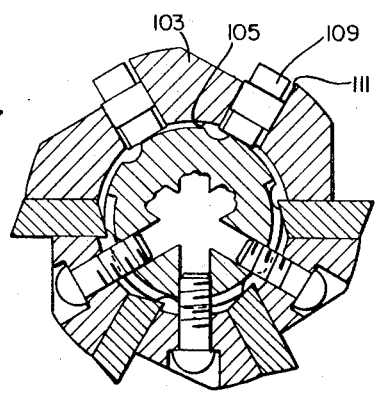

3,827,119

TOOL HOLDER WITH PROVISIONS FOR ACCURATELY POSITIONING CUTTING INSERTS AND AN IMPROVED CHIP BREAKING INDEXIBLE INSERT

This is a division, of application Ser. No. 285,121, filed Aug. 31, 1972, which is a division of Ser. No. 19,023 filed Mar. 12, 1970, now U.S. Pat. No. 3,688,367.

BACKGROUND OF THE INVENTION

This invention relates generally to tool holders having at least one blade removably inserted therein.

The recent trend in the use of automatic equipment in manufacturing has resulted in a need of tool holders that may be made a part of numerical control equipment with blade cutting edges positively located with respect to some reference location on the machine. The need is especially great for rotary tool holders that maintain cutting edges of its blades a precise radial distance from its tool's axis of rotation and also a precise axial distance from some reference point therealong. Therefore, it is a primary object of this invention to provide a tool holder, especially a rotary tool holder, capable of such positive positioning of at least one indexible cutting blade inserted therein.

It is another object of this invention to provide a tool holder in which an insertable blade can be indexed after a period of use to provide fresh cutting edges located at the same predetermined positions relative to the tool holder as the original positions of the used cutting edges, within very close tolerances.

It is yet another object of this invention to provide a multiple indexible blade tool holder having a minimum of loose parts for holding the blades.

It is yet another object of this invention to provide an improved indexible cutting blade for insertion in a wide variety of tool holders and having improved chip breaking characteristics.

SUMMARY OF THE INVENTION

Briefly, a tool holder according to the present invention is of the type having at least one cutting blade receiving slot in a body and having a pair of opposing parallel planar surfaces substantially of a shape and area of opposite parallel planar surfaces of the intended blades. The opposing planar surfaces of the tool body are drawn toward each other to hold the blade by compression against its opposite parallel planar surfaces. An improved means for positioning the blade is associated with the blade receiving slot and includes two spools inserted into the tool holder body in positions along adjacent edges of the blade receiving slot between the planar surfaces thereof. The spools are shaped to contact the blade inserted therein at only a portion of the width of adjacent blade surface edges and near the middle thereof. Therefore, the inserted blade will be accurately positioned relative to the tool holder body even if the spool contacting surface edges of the blade have been worn at the cutting edges thereof from previous use. Also, this technique of positioning and holding a blade prevents the binding of a blade corner which could cause failure thereof during its use after indexing.

Each of the two spools associated with each blade receiving slot are undercut along a portion therealong so that each blade is contacted at three locations for positive positioning thereof. If a blade is rectangular in shape but not square, its longer of two adjacent surface edges is preferably contacted by a spool that is undercut in the middle thereof to leave two blade contacting locations, while the shorter adjacent surface edge of the blade is positioned against a spool that is undercut at its ends to leave a single blade contacting location therealong.

According to one aspect of the present invention, both blade positioning spools associated with each slot have a diameter about equal to or less than the thickness of the blade inserted therein, which thickness is the distance between the opposing parallel planar surfaces of a tool holder blade receiving slot when drawn against a blade. Spools of this size keep the area of the blade surface edges contacted a small portion of the total blade surface edge width. A wide variety of blade shapes may be so positioned by two spools, such as blades having the shape of a square, a triangle, a rectangle, a pentagon, a diamond and even an arcuate shaped blade. The shape of the blade to be inserted determines the finite angle between the pair of spools associated with a given blade receiving slot in the tool body. The use of spools inserted in the tool body is preferred over shaping the tool body itself in a corresponding manner since construction of such a tool holder is easier and results in a more accurate blade position relative thereto. The specific embodiment of this aspect of the invention described hereinafter is a multiple blade rotary cutter in the form of a center-cut mill which has its two spools substantially orthogonal to one another, one spool being parallel to the axis of rotation of the tool holder and the other spool being radially positioned.

According to another aspect of the present invention, a rotary tool holder having a plurality of insertible blade receiving slots utilizes a single large spool which positions radially each of the several inserted blades. Each of the blades is positioned axially by an individual spool positioned substantially orthogonal to the large diameter spool. A hollow sleeve having inside dimensions slightly larger than outside dimensions of the large spool is provided with blade receiving slots extending from one end of the sleeve, each slot having opposite planar sides. The large spool is positioned in the sleeve and coaxial therewith. The sleeve has a cylindrical inside surface with a diameter slightly larger than the outside diameter of a cylindrical large spool, for an embodiment employing rectangular insertable blades. Segments of the sleeve between the blade receiving slots are securely attached to the spool to compress and hold the blades. In an embodiment wherein the axial extension of the hollow sleeve is small, a wedge is employed in the sleeve to force each pair of opposing planar slot sides against a blade inserted therein. The large spool has formed thereon for each blade receiving slot a ridge intermediate of the opposite planar sides of the slot. This ridge is illustrated herein to be formed by a groove in the spool associated with each slot. Alternatively, the spool is made a polygon shape in cross-section to form the desired blade contacting at the intersection of adjacent planar sides of the large spool.

According to yet another aspect of the present invention an improved solid indexible carbide cutting blade is provided. A plurality of chip breaking grooves are formed in the cutting edge and extend into the surface of the blade adjacent the cutting edge that leads against the work piece. This is an improvement over existing blades which have chip breaking slots extending along the trailing blade surface adjacent to a cutting edge. The result of this improvement is that metal chips from the work are broken up finer and thereby disposed of more quickly. The horsepower necessary to drive a rotary tool holder is reduced and coolant distribution is improved. Furthermore, the chip breaking grooves are provided in a manner that their function is not destroyed upon wear of the cutting edge.

The present invention in its various aspects has only been summarized briefly. For a more detailed understanding of the invention and for further objects and advantages thereof, reference should be made to the following description of its preferred embodiments taken in conjunction with the accompanying drawings.

BRIEF DESCRIPTION OF THE DRAWINGS

FIG. 4 is a sectional view of the rotary tool holder taken at 4—4 of FIG. 3;

FIG. 5 is yet another cross-sectional view of the rotary tool holder of FIG. 1 taken at 5—5 of FIG. 4;

FIG. 6 is a rotary insertable blade tool holder according to another aspect of the invention;

FIG. 7 is an end view of the rotary tool holder of FIG. 6;

FIG. 8 is a cross-sectional view of the rotary tool holder shown in FIG. 6 across 8—8;

FIG. 9 is a partially sectioned view of the rotary tool holder of FIGS. 6–8 taken across 9—9 of FIG. 7;

DESCRIPTION OF THE PREFERRED EMBODIMENTS

Figure 1:
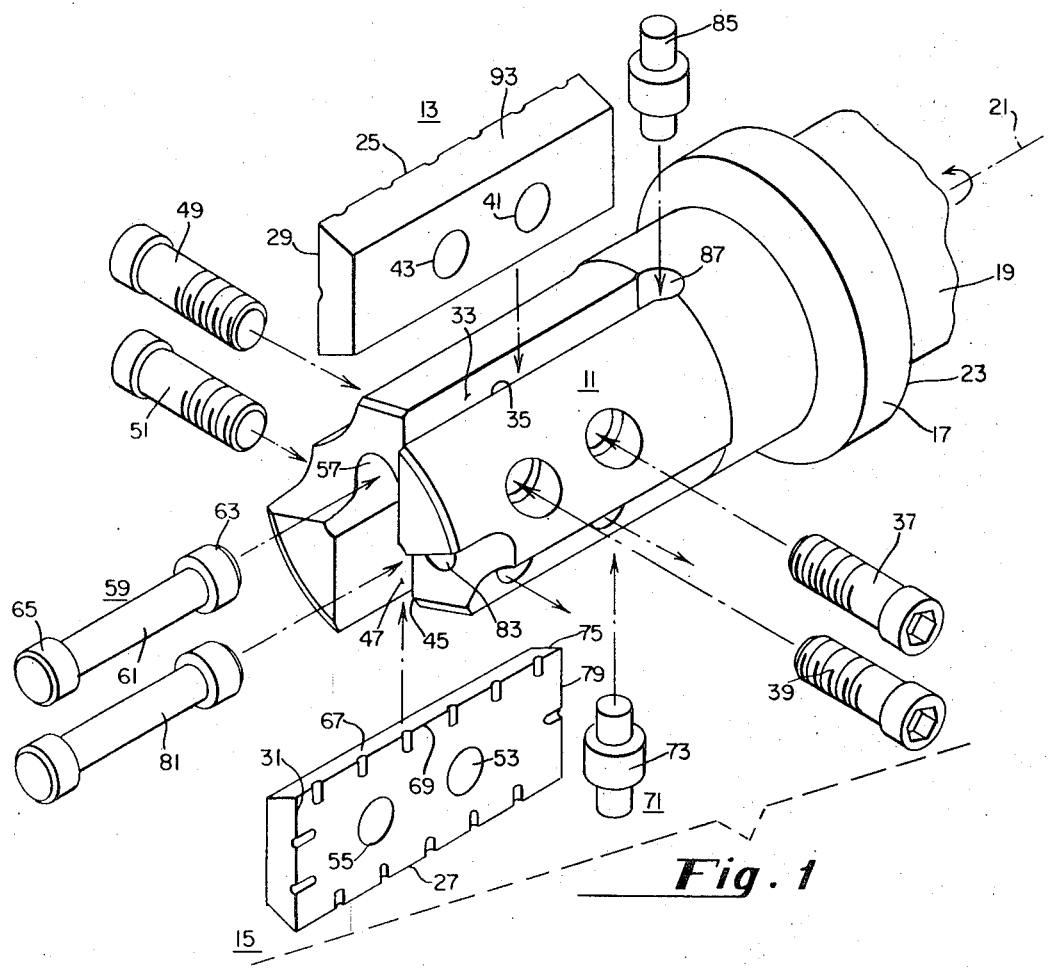
FIG. 1 is an exploded view of a center cut rotary tool holder embodying the present invention.
Figure 2:
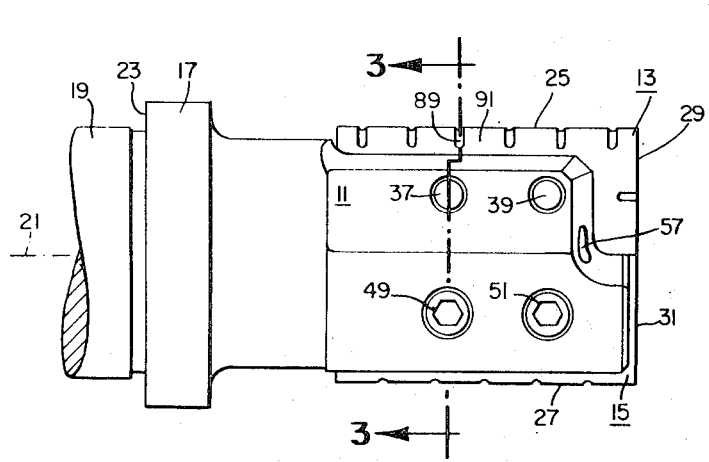
FIG. 2 is a side view of the rotary cutter according to FIG. 1 in assembled form.
Figure 3:
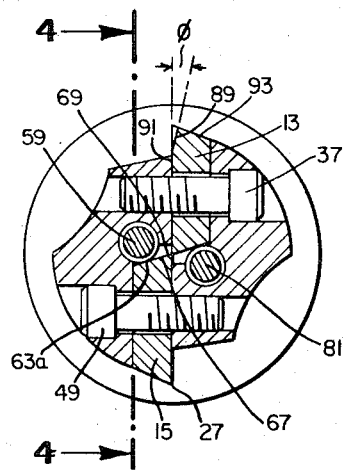
FIG. 3 is a section view of the rotary tool holder taken at 3—3 of FIG. 2.

Referring to FIGS. 1–5, a specific tool holder utilizing various aspects of the present invention is described. This tool holder has a primary use as a center-cut mill. It has a generally cylindrical body portion 11 for holding insertable cutting blades 13 and 15. The body 11 terminates in an enlarged portion 17 and is connected to a shank 19. The tool holder is designed to be rotated through the shank 19 about a defined axis of rotation 21. The tool holder is designed for the cutting edges of the blades held thereby to be located with precision with respect to the axis of rotation 21 and a position axially therealong, such as the rear surface 23 of the enlarged body portion 17. A tool holder with blades inserted therein may then be chosen with these parameters equal to a desired value for a given operation with the holder inserted into automatic equipment. This is, a cutting edge 25 of the blade insert 13 and a cutting edge 27 of the blade insert 15 are positioned, in this specific embodiment, parallel to the axis of rotation 21 and a precise distance therefrom. Also, a cutting edge 29 of the insertable blade 13 and a cutting edge 31 of the insertable blade 15 are positioned a fixed distance from the axial reference surface 23.

The insertable blade 13 is held by a slot in the body 11 having opposing planar surfaces 33 and 35 which are separated a distance approximately equal to the thickness of the blade 13 to be inserted therein. The blade 13 is rigidly held in the slot by a pair of screws 37 and 39 which pass through holes 41 and 43, respectively, of the blade 13. The screws 37 and 39 force the opposing planar sides 33 and 35 of the blade receiving slot toward each other to hold the blade 13 in position by compression. Of course, other specific ways of fastening the blade 13 in the body 11 will become apparent but it has been found that for a rectangularly shaped blade 13 as shown, the holding thereof under compression is preferably aided by at least one screw passing through the blade itself. The blade 15 is held in a similar manner in a second blade receiving slot of body 11 having opposing planar parallel sides 45 and 47 which are drawn together against the blade 15 by a pair of screws 49 and 51 which pass through holes 53 and 55, respectively, of the blade 15.

The blades 13 and 15 are accurately positioned by a pair of spools along adjacent narrow sides of their respective blade receiving slots within the tool holding body 11. This positioning is first described for the blade 15. A round hole 57 is provided in the body 11 in a direction generally parallel with the axis of rotation 21. The hole 57 is adjacent to the planar surface 47 of the blade receiving slot. A spool 59 is inserted in the hole 57, thereby to partially close the slot between its opposing planar sides 45 and 47 along one edge thereof. The spool 59 is undercut in its middle segment 61, leaving end segments 63 and 65 with surfaces for contacting the blade edge surface 67 at two locations at opposite ends of the blade. Furthermore, as can best be seen in the view of FIG. 3, the blade edge surface 67 is contacted by the end segment 63 of the spool 59 at a location 63a.

It will be noted that the location 63a of contact is intermediate of the opposite planar sides of the blade 15. Therefore, if a cutting edge 69 of the blade 15 has been worn by prior use, that wear will not affect the position of the fresh cutting edge 27 relative to the tool's axis of rotation 21. The blade edge surface 67 is contacted by the spool end 65 in a similar manner. Furthermore, the diameter of the spool ends 63 and 65 have preferably been made small relative to the thickness of the blade, perhaps approximately the same as the thickness of the blade or less, so that the areas of contact (such as area 63a) between the spool 59 and the surface edge 67 are small relative to the total width of the edge surface 67. Small areas of contact between the spool and the blade edge assure accurate positioning of the blade 15 regardless of the amount of wear at the blade's cutting edges.

The slot in the body 11 for receiving the blade 15 is closed along another edge thereof by an axial spool 71 having a segment 73 of maximum diameter in the middle thereof for contacting the blade edge surface 75. The spool 71 is inserted into a hole 77 of the body 11. The maximum diameter of the spool 71 is related to the thickness of the blade 15 so that the area of contact between the two is a small portion of the width of the blade edge surface 75, for the reasons discussed with respect to the spool 59. Also, the hole 77 to which the spool 71 is inserted is positioned relative to the opposing slot planar sides 45 and 47 so that the area of contact between the portion 73 of the axial spool 72 and the surface edge 75 of the blade 15 is away from the cutting edge 79. Therefore, the blade 15 will not be positioned differently when the cutting edge 79 happens to be worn.

Therefore, it can be seen that the blade 15 is accurately positioned both radially and axially by a combination of a radial spool 59 and an adjacent axial spool 71. The cutting edges 27 and 31 are accurately positioned since the blade 15 is contacted at its edges by only three relatively small locations which can be carefully controlled. Such three point contact also allows easy and accurate indexing of the blade 15 when one of its cutting edges becomes worn.

The cutting blade 13 is held in a similar manner and a detailed explanation thereof is believed to be unnecessary. A radial spool 81 positioned in a hole 83 provided in the body 11 adjacent to the surface 35 of the slot for receiving and holding the blade 13. An axial spool 85 is inserted in a hole 87 of the tool body 11. Therefore, the spools 81 and 85, as well as the opposing planar surfaces 33 and 35, define the surfaces of the slot that contacts and holds the insertable blade 13.

It will be noted that each of the cutting edges of the blades 13 and 15 are illustrated in FIGS. 1–5 to have a plurality of chip breaking grooves therealong. One such chip breaking groove is illustrated in detail on blade 13 in FIGS. 2 and 3. A bottom 89 of a chip breaking groove extends from the planar surface 91 at an angle $\phi$ with respect thereto. The bottom 89 of the chip breaking groove terminates in the blade edge surface 93. It is the acute angular intersection of the large planar surface 91 and the blade edge surface 93 which forms the cutting edge 25. It will also be noted in the embodiment of FIGS. 1–5 that the broad surface 91 of the blade 13 is the leading surface relative to the work which is being cut thereby. The angle $\phi$ is a small acute angle whose value depends upon feed rate of the work, and for many applications may be in a range of from 11° to 20°. The long portion of each chip breaking groove is in the leading side of the blade adjacent to a cutting edge, instead of extending across a trailing edge, such as edge 93 of blade 13, as is the present practice. It will be understood that blades employing the improved chip breaking grooves according to this invention are useful not only in the tool holders described herein but are also of general applicability.

Chip breaking grooves on each of the blades shown in FIGS. 1–5 may be spaced as a specific example, about one quarter inch apart. The grooves on opposite cutting edges of a blade may be staggered as may be seen from the table 15 in FIG. 1. This staggering has an advantage in a tool employing more than one blade since each of the blades may be inserted therein in a manner that chip breaking grooves on the active cutting edge of one blade are shifted half a space with respect to the chip breaking grooves on the active cutting edge of the other blade. The cutting blades 13 and 15 of FIGS. 1–5 are shown with such staggering, as is clear especially in FIGS. 1 and 4.

Another specific rotary tool holder embodying the two spool method of blade positioning is shown in FIGS. 6–9. A shank 101 as formed as a part thereof a sleeve 103 having a generally cylindrical inner surface 105. Within the sleeve 103 is a solid spool 107 having a maximum outside diameter slightly less than the inside diameter of the inner surface 105 of the sleeve 103. The sleeve 103 has a plurality of blade receiving slots therearound, each slot extending from the end of the sleeve opposite the shank. Each blade receiving slot extends from this end of the sleeve and terminates in a spool, such as the spool 109 positioned in a hole 111 of the sleeve 103. The spool 109 positions one edge of the blade 113, much in the same manner as the axial spools discussed hereinabove with respect to FIGS. 1–5. Also, in the embodiment of FIGS. 6–9, the blade 113 is held in the sleeve 103 under compression between sleeve segments 115 and 117. These segments are attached to the spool 107 by screws such as those shown at 119 and 121. As the segments 115 and 117 are drawn by such screws toward the spool 107, opposite planar surfaces 123 and 125 defining a blade receiving slot are drawn against the blade 113 to hold an imposition under compression. Each of the other blades held by the sleeve 103 are positioned and fastened in a similar manner.

It will be noted that the spool 107 contacts each of the blades held by the sleeve 103 and positions them radially, instead of providing a separate small spool for each of the blades. In order to so position each of the blades such as the blade 113, a ridge, such as the ridge 127, is provided with a blade contacting portion for contacting an edge surface of the blade for an area less than the width of the blade. The blade 113 has an edge surface which rests on the ridge 127 at a location removed from a cutting edge 131 that is not being used. Therefore, if the cutting edge 131 has been worn by prior use, an active cutting edge 133 of the blade 113 is accurately positioned relative to the axis of rotation of the tool holder. The ridge 127 is formed at the edge of a groove 134 provided in the otherwise cylindrical spool 107. The groove 134 can be any shape necessary to obtain a ridge 127 which contacts a blade at only a small area across its edge surface width and removed from a cutting edge.

As with the individual axial spools described in the embodiment of a tool holder shown in FIGS. 1–5, the spool 107 is undercut in its middle to leave end portions 135 and 137 for contacting each blade with a supporting ridge. Therefore, as with the previous tool holder embodiment, each blade is contacted at adjacent edges thereof, at a total of three locations to provide positive and accurate positioning of the blade's cutting edges.

It will be noticed from FIGS. 6–8 that each of the blades is shown with an axial rake. This means that the blade contacting ridges of the spool 107, such as ridge 127, is also placed at an angle in order to follow the side 113 along its length and support it radially. Since it is also desired that each point on the cutting edge 133 of the blade 113 be a constant radial distance from the axis of rotation of the tool holder, the groove 127 must also have all points thereof which contact the blade a uniform radial distance from the tool's axis of rotation. If the spool 107 is basically cylindrical in shape, an adjustment must be made in the groove so the ridge 127 can maintain such a uniform radial position.

Figure 10:
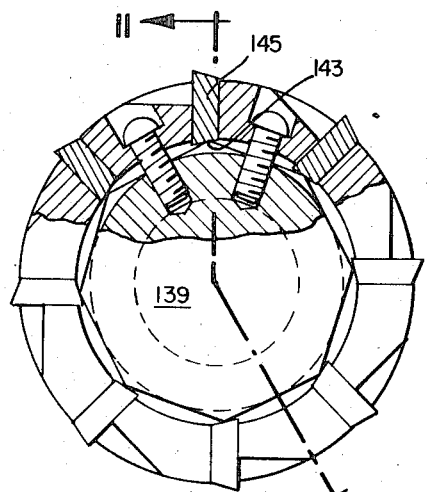
FIG. 10 shows an end view partially cut away of a rotary tool holder according to yet another aspect of the present invention that is a modification of the rotary tool holder illustrated in FIGS. 6–9.
Figure 11:
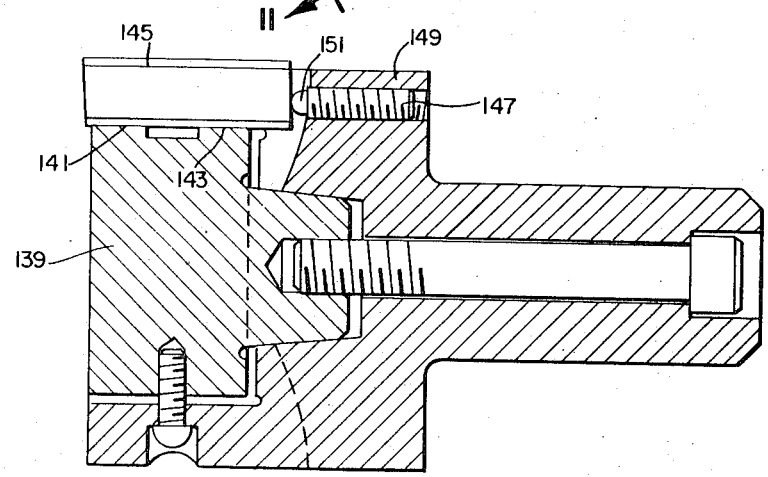
FIG. 11 is a cross-sectional view of the modified rotary tool holder of FIG. 10.
Figure 12:
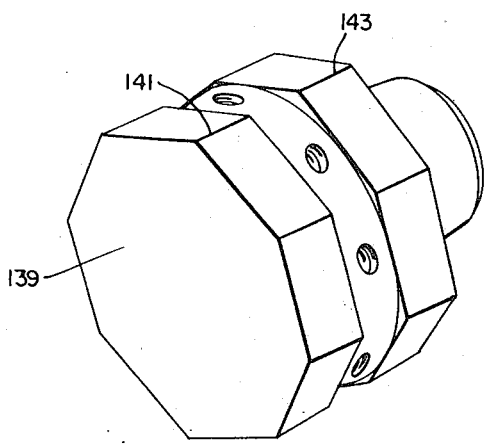
FIG. 12 is a perspective view of the inner spool component of a modified tool holder illustrated in FIGS. 10 and 11.

A modification of a tool holder described with respect to FIGS. 6–9 is shown in FIGS. 10–12. The embodiment of FIGS. 10–12 utilizes a spool 139 within the blade holding cylindrical sleeve that has a cross-sectional shape of a many sided regular polygon, instead of a generally circular cross-section as described hereinbefore. Two segments 141 and 143 of a blade contacting and positioning ridge are formed at the intersection of adjacent sides of a polygon shaped spool. As can be seen in FIG. 10, the ridge 143 contacts the edge of a blade 145 intermediate to its sides to retain the accurate positioning and easily indexible features of the tool holder embodiments described hereinabove.

Another modification of the tool holder embodiment shown in FIGS. 10–12 from the embodiment shown in FIGS. 6–9 is in the means for axially positioning each blade. In FIGS. 6–9, an individual spool was used for each blade. In the embodiment of FIGS. 10–12, each blade is axially positioned by an individual screw such as the screw 147 threaded into a sleeve 149 and having a rounded end 151 for contacting the blade 145 in a limited area thereof. It will be recognized that the blade positioning technique in the embodiment shown in FIGS. 10–12 retains the three point contact feature of each blade for accurate positioning. Contact of each blade is at limited areas which allows easy and accurate indexing of each blade, as discussed hereinabove with respect to the other embodiments.

Figure 13:
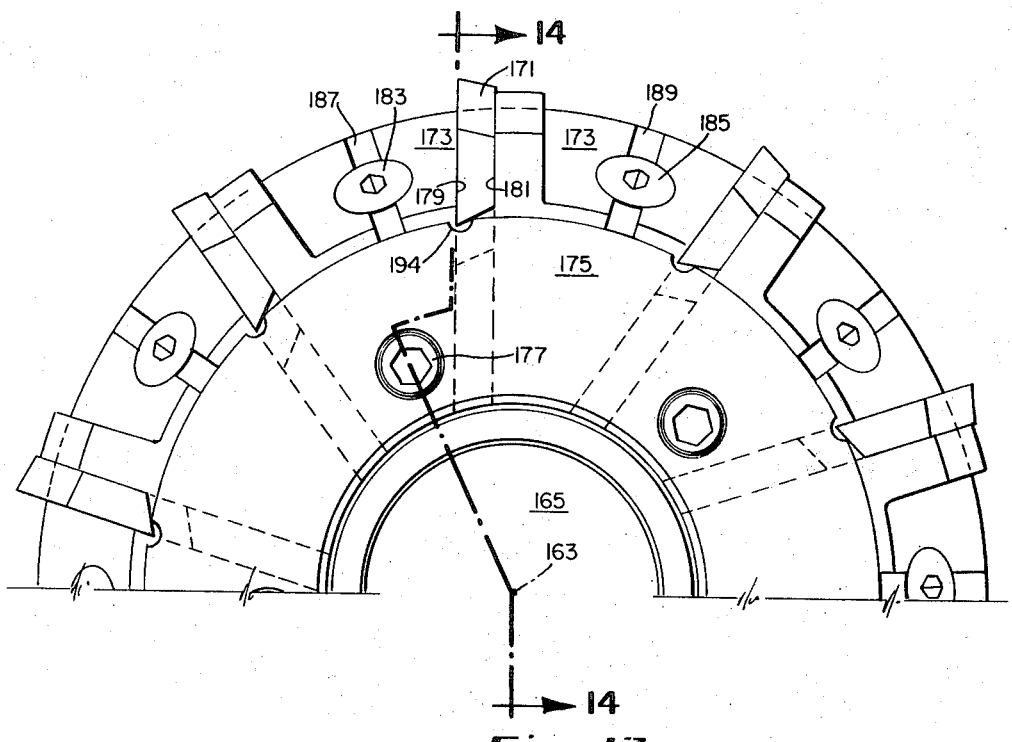
FIG. 13 is a rotary insertable blade tool holder according to yet another aspect of the present invention.
Figure 14:
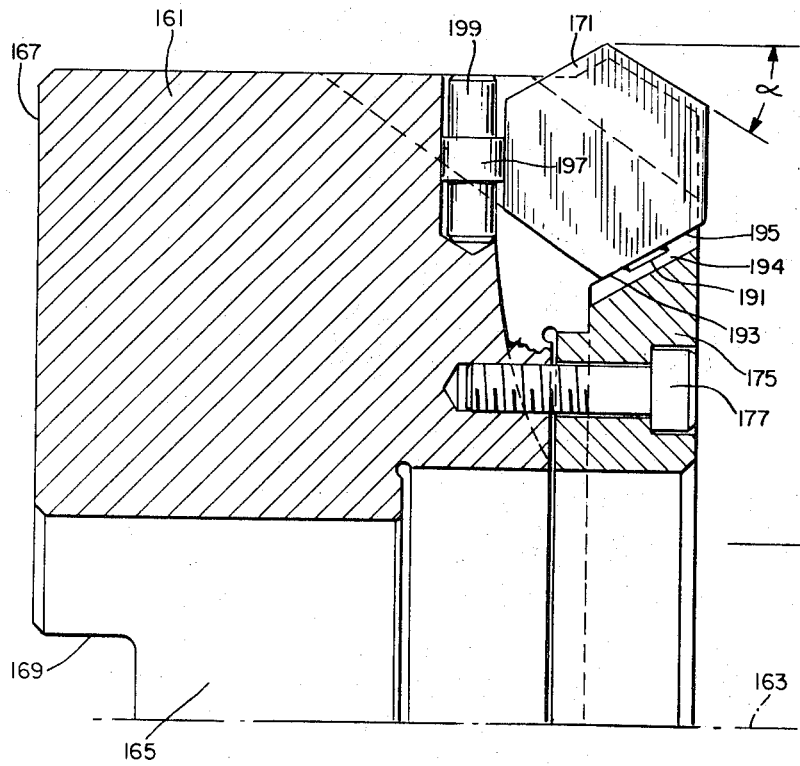
FIG. 14 is a partially sectioned view of the rotary tool holder of FIG. 13 taken across 14—14.

Yet another specific rotary tool holder embodying the two spool method of blade positioning is shown in FIGS. 13–14 in the form of a face mill. A rotary tool holder body 161 is designed to rotate about an axis 163 and is provided with a centering arbor hole 165. A rear surface 167 of the body 161 serves as a reference a specific distance from which a plurality of insertable blades are held in an opposite surface of the tool holder body. The surface 167 is provided with a slot 169 for receiving a driving key of the machinery into which the entire rotary tool holder is fitted.

The tool holder of FIGS. 13–14 has a plurality of insertable blade receiving slots for holding hexagonal shaped blades. An insertable blade 171 is shown in some detail. The tool holder body 161 is provided with a short sleeve portion 173 within which a large spool 175 is positioned and attached to the body 161 by a plurality of bolts, including the bolt 177. The blade 171 is held in a slot formed in the sleeve 173 between two opposing planar surfaces 179 and 181 thereof. The blade 171 is held by compression between the surfaces 179 and 181 upon the urging of wedge shaped screws 183 and 185 which are threadedly attached to the body 161 within slots 187 and 189, respectively, of the sleeve portion 173 of the body. As the wedge shaped screws are threaded into the body, the slots 187 and 189 expand, thereby forcing the surfaces 179 and 181 against the insertable blade 171.

As with the other specific embodiments described herein, the specific embodiment with respect to FIGS. 13–14 utilizes a pair of spools to position the blades axially and radially within the rotary tool holder. The large spool 175 contacts all blades at two positions along one of the six thin edges thereof. It will be noted that the spool 175 is relieved around its circumference at a portion 191, thereby leaving surfaces 193 and 195 for contacting opposite ends of an edge of each blade, such as the blade 171 shown in FIG. 14. The surfaces 193 and 195 are formed by an edge of a slot 194, similar to the previous embodiment described with respect to FIGS. 6–9. The surfaces 193 and 195 of FIG. 13 contact an edge of the blade 171 intermediate of the opposing blade receiving slot surfaces 179 and 181.

Another edge of the blade 171 is contacted by a surface 197 of its individual spool 199 having a small diameter. The blade 171 is thereby accurately positioned relative to the axial reference surface 167 of the tool holder and its axis of rotation 163 by a pair of blade contacting spools 175 and 199. Accurate blade positioning in this tool holder is also desirable for maintaining the angle $\phi$ constant when one blade is substituted for another or when a used blade is indexed. The small diameter spool 199 for positioning the blade 171, as well as each other individual blade contacting spool for each of the other blades in the tool holder, additionally is given a diameter small enough relative to the thickness of the blade so that only a small portion of the width of the blade edge is contacted by the spool.

It may be noted that a common insertable blade positioning technique is utilized in various forms in all the tool holder preferred embodiments specificly described herein. The insertable blade has a pair of broad planar surfaces on opposite sides thereof separated a distance which is small relative to the lateral extent of each of the planar surfaces, thereby resulting in a "thin" blade. The opposite planar surfaces are generally parallel, but they need not be exactly so. Joining the opposite planar surfaces of each blade are a plurality of planar edge surfaces. The blade is held in a tool holder primarily by compressive forces directed against the opposing planar surfaces of the blade. An insertable blade is accurately positioned within the tool holder by resting two planar edge surfaces thereof against three independent supporting areas. One of the two planar edge surfaces contacts two of the supporting areas while the second of the two blade planar edge surfaces contacts the third supporting area. The three independent supporting areas are preferrably provided for each insertable blade by a pair of spools inserted into openings of the tool holder. These three areas are kept small and are separated along the length of the blade edges a distance that is at least as great as the size of the area.

It shall be understood that the invention is not limited to the specific arrangements shown, in that changes in modifications may be made within the scope of the appended claims.

What is claimed is:

1. A rotary tool holder, comprising,
a tool body having a defined axis of rotation,
a plurality of insertable blade positioning and holding slots within the tool body, each of said slots including,
a pair of opposing planar surfaces, each having substantially the same shape and dimensions as the other, said surfaces extending from an edge of the tool body inward generally toward the axis of rotation of said body and separated a given distance from each other, and
a pair of spools having a maximum diameter approximately equal to or less than the given distance between said planar surfaces and held within said body along adjacent edges of at least one of said planar surfaces, the axes of the spools making a fixed angle with each other, and a separate means drawing each pair of opposing planar surfaces toward each other for holding a blade therebetween by compression.

2. The rotary tool holder according to claim 1 wherein said pair of opposing planar surfaces of each blade positioning and holding slot are rectangular in shape and wherein said fixed angle between the axes of said spools is approximately 90°.

3. The rotary tool holder according to claim 2 which has exactly two blade positioning and holding slots and wherein an edge of one of each pair of opposing planar surfaces is coincident with said body axis of rotation and wherein one of said pair of spools associated with each slot is oriented with its axis parallel to the defined axis of rotation and is held adjacent an edge of the other of said pair of opposing planar surfaces of each slot.

4. The rotary tool holder according to claim 3 wherein the long edge of each rectangular planar surface is oriented axially to said body and wherein said separate means for holding a blade between opposing planar surfaces of each slot includes a separate bolt passing through each pair of opposing planar surfaces to draw together the portions of said body on either side of said slot.

5. The rotary tool holder according to claim 1 wherein at least one of said pair of spools is relieved in its center for a significant portion along its length, thereby to provide blade contacting portions at opposite ends of the edge of said at least one planar surface against which the spool is positioned.

* * * * *